United States Patent [19]

McConachy

[11] 4,184,651

[45] Jan. 22, 1980

[54] FISHING REEL ASSEMBLY

[76] Inventor: Harry R. McConachy, 60 Moonya Rd., Murrumbeena, Victoria, Australia

[21] Appl. No.: 913,012

[22] Filed: Jun. 6, 1978

[30] Foreign Application Priority Data

Jun. 20, 1977 [AU] Australia .................. PD0507

[51] Int. Cl.² ........................ A01K 89/015
[52] U.S. Cl. ............................... 242/84.2 B
[58] Field of Search ......................... 242/84.2 B

[56] References Cited

U.S. PATENT DOCUMENTS

| | | | |
|---|---|---|---|
| 2,546,559 | 3/1951 | Nix | 242/84.2 B |
| 2,602,602 | 7/1952 | Vijande | 242/84.2 B |
| 2,708,077 | 5/1955 | Dalzell et al. | 242/84.2 B |
| 2,746,694 | 5/1956 | Kauppi | 242/84.2 B |
| 2,796,224 | 6/1957 | Jefferson | 242/84.2 B |
| 2,941,748 | 6/1960 | Matthiesen | 242/84.2 B |
| 3,033,485 | 5/1962 | Shearer | 242/84.2 B |

*Primary Examiner*—Billy S. Taylor
*Attorney, Agent, or Firm*—Laurence R. Brown

[57] ABSTRACT

The present invention provides a fishing reel assembly of the side cast type comprising retrieval guide means for reducing the possibility of a fishing line becoming entangled upon retrieval and/or means for holding the fishing line during the initial part of the cast. The fishing reel assembly preferably comprises a conveniently located actuating lever. This lever when operated by one finger simultaneously performs four functions. It may unlock the spool assembly from a fixed mounting bracket, rotate the spool assembly from the retrieve to the cast position, swing the retrieval line guide clear of the casting edge of the spool, and apply a finger to the casting edge of the spool to hold the line during the initial part of the cast.

6 Claims, 5 Drawing Figures

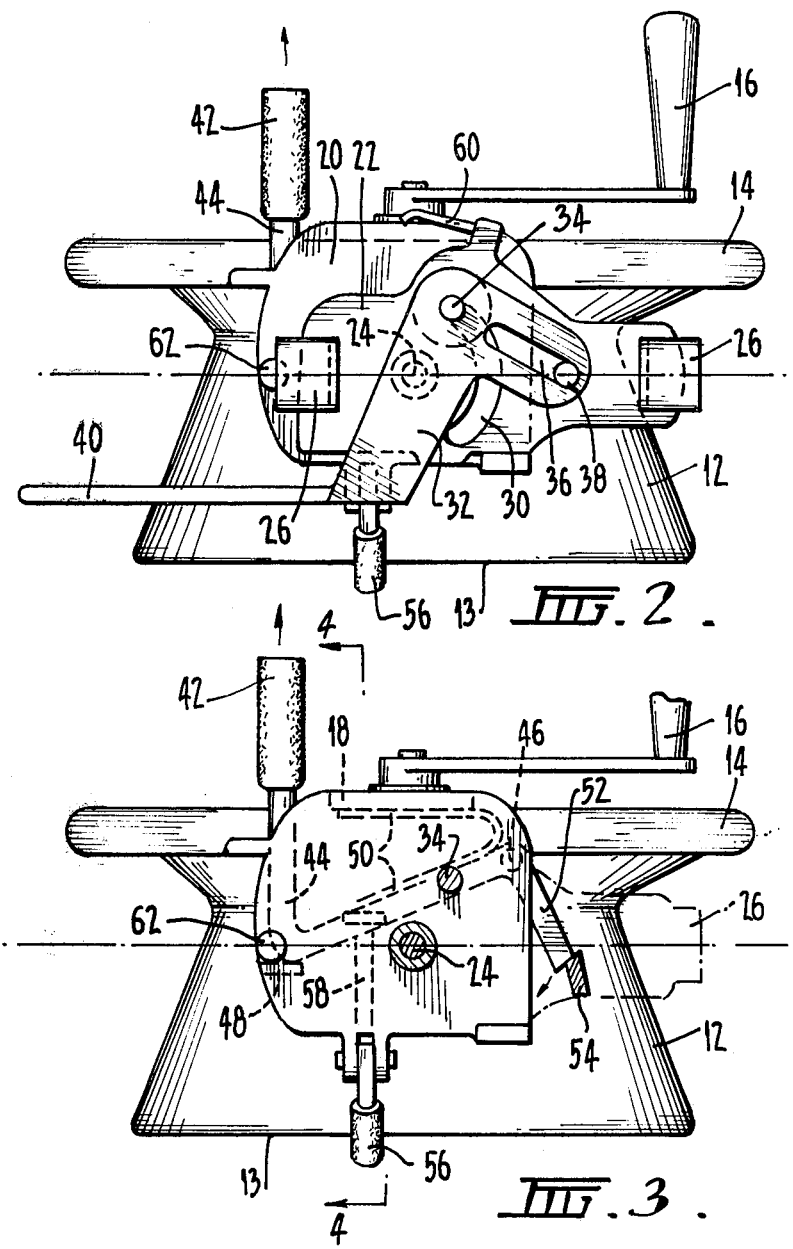

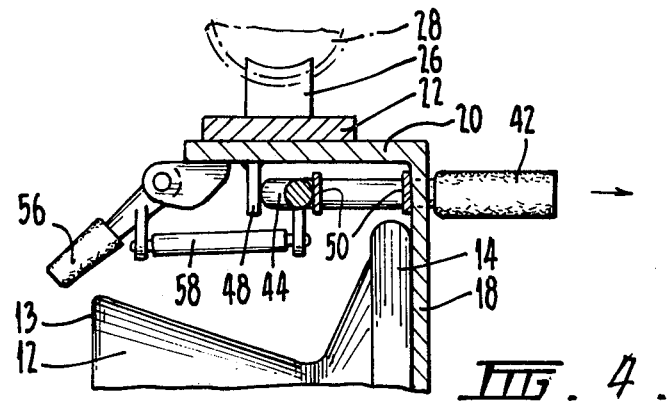
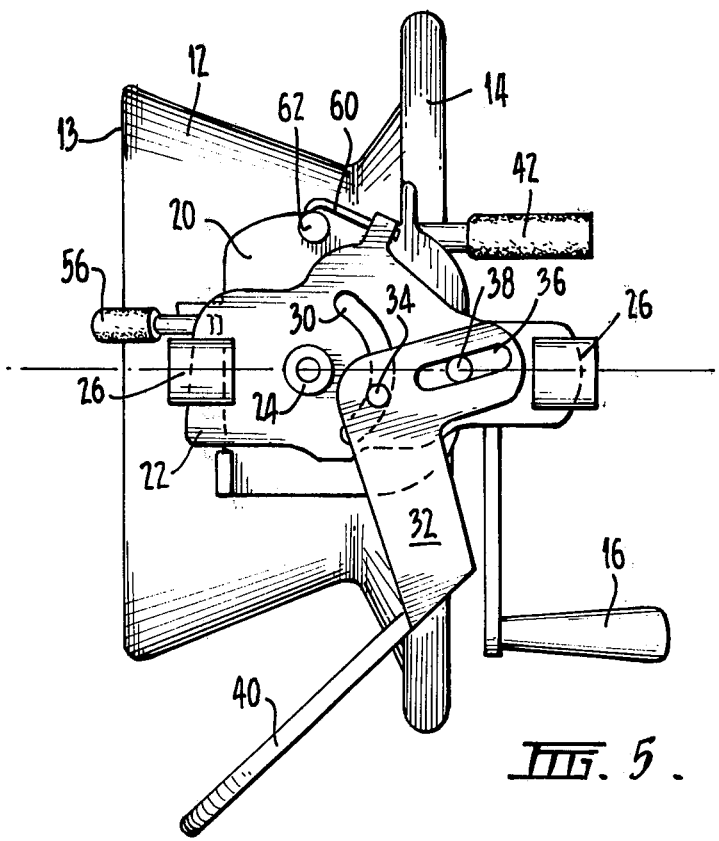

FISHING REEL ASSEMBLY

The present invention relates to fishing reel assemblies. There are two types of fishing reel assembly in common use at the present time. One of these types is called the side cast reel which comprises a spool arranged to be orientated at right angles to the fishing rod whilst casting the line and longitudinally to the fishing rod whilst retrieving the line. For casting it is necessary to unlatch the spool and rotate it through 90° manually. Further, during the initial part of the cast it is necessary for the line to be held with a finger. Thus, the initial part of the cast is a two handed operation.

Also, when the line is being retrieved it frequently happens that the line runs off the spool and becomes entangled. This problem is particularly troublesome when fishing at night.

The other type of fishing reel in common use is the spinning reel. For casting with a spinning reel it is first necessary to trip a bail wire manually whilst holding the line with a finger. Thus once again the initial part of the cast is a two handed operation. Further, the spinning reel, because the spool is always orientated at right angles to the rod, requires a complex bevel gear arrangement between the handle for rotating the spool and the spool itself. Also, its construction necessitates a long stalk connecting the reel to the rod. The whole assembly is a cumbersome and inefficient way of wrapping a line on a spool.

The present invention provides a fishing reel assembly of the side cast type which overcomes at least one of the disadvantages associated with known side cast fishing reels.

In accordance with one embodiment of the present invention there is provided a fishing reel of the side cast type comprising retrieval guide means arranged to reduce the possibility of the line running over the casting edge of the spool whilst the line is being retrieved and to be pivoted clear of the casting edge of the spool upon rotation of the spool into the casting position.

In accordance with a further embodiment of the present invention there is provided a fishing reel assembly of the side cast type comprising means for holding the line during the initial part of the cast.

The present invention will now be described with reference to the accompanying drawings, in which:

FIG. 2 is a plan view of the fishing reel assembly of FIG. 1 with a retrieval guide means in position for retrieval of a line;

FIG. 3 is a view similar to FIG. 2 with certain components removed along the line 3—3 of FIG. 1 to show more clearly a means for holding a line whilst the reel is being readied for casting;

FIG. 4 is a part sectional view along the line 4—4 of FIG. 3; and

FIG. 5 is a plan view similar to FIG. 2 showing the retrieval guide means in position for casting off a line.

Figure 1:
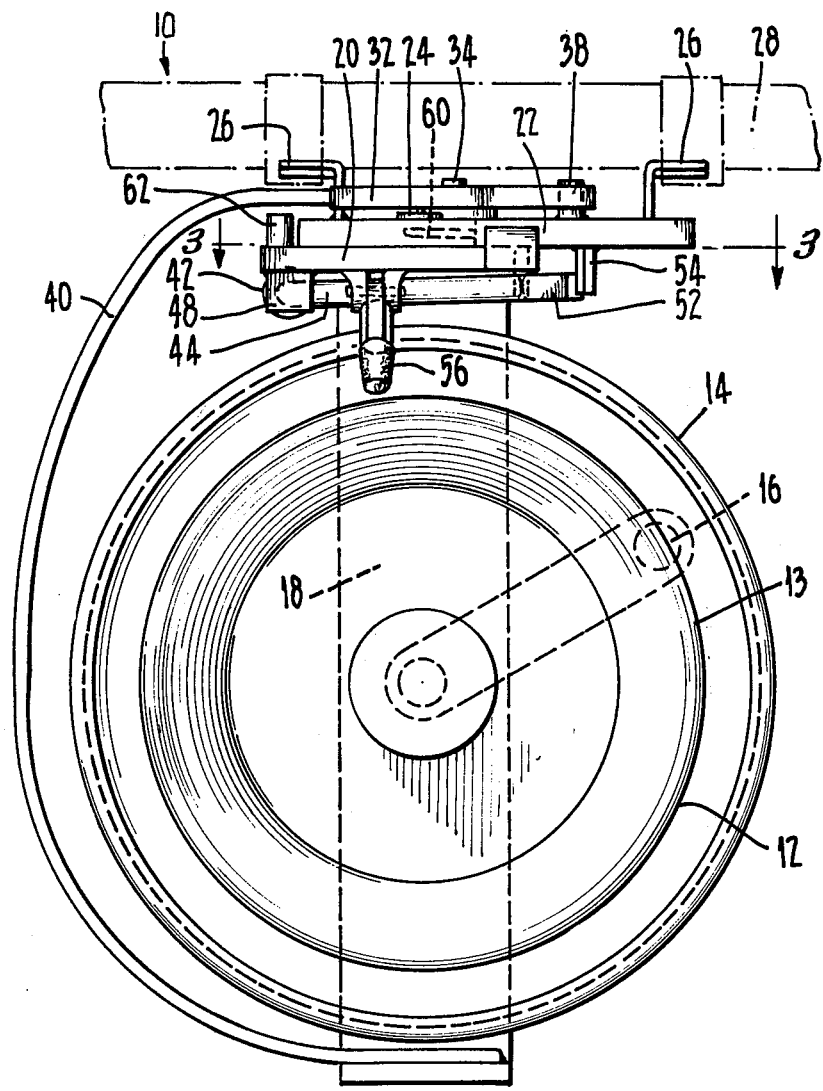
FIG. 1 is a side elevation of a fishing reel assembly in accordance with the present invention.

In the drawings, there is shown a fishing reel assembly 10 comprising a spool 12 rotatably mounted on a spindle (not shown) projecting from an elongated bracket 18. A handle means 16 is mounted centrally of a circular plate 14 and the spool 12. The curved face of the spool 12 is circumferentially recessed to enable a fishing line to be wrapped around and retained on the spool 12. As can be seen in FIGS. 2-5 the curved face of the spool 12 has a relatively shallow slope away from the bottom of the recess on the side thereof remote from the plate 14. The relatively shallow slope terminates in a casting edge 13 of the spool 12.

The plate 14 is attached to the elongated bracket 18 by any suitable means such as screws (not shown). A pivot plate 20 is integrally formed with the bracket 18 at one end thereof as can best be seen in FIG. 4. The pivot plate 20 is partially rotatably mounted on an elongated base plate 22 by means of a pin 24. The base plate 22 comprises a lug means 26 at each end for attachment to a fishing rod 28 as shown in FIGS. 1 and 4. Further, the base plate 22 comprises an arcuate transverse slot 30. An L-shaped bracket 32 is pivotally mounted on a pin 34 fixed in the pivot plate 20 and extending through the slot 30 of the base plate 22. The bracket 32 is mounted on the pin 34 at the corner between the base and the upright of the L-shape. The base of the bracket 32 contains a straight slot 36 in which is located a stud 38 fixed to the base plate 22. The extremity of the upright of the bracket 32 is firmly attached such as by welding to one end of a line retrieval guide 40. The line retrieval guide 40 is a substantially semicircular wire extending from the bracket 32 to a point adjacent the lower end (as seen in FIG. 1) of the bracket 18 at which it is turned through a right angle to form a pivotal connection with the bracket 18. Thus, the ends of the wire are substantially diametrically opposite to one another across the spool 12.

As can best be seen in FIGS. 3 and 4, the side of the pivot plate 20 adjacent the spool 12 has an actuating member 42 pivotally mounted thereon through a lever 44 and a pin 46. The lever 44 is urged into engagement with a stop 48 by means of a spring 50 (FIG. 3). Further, the lever 44 is provided with a right angled extension 52 which, in the condition of the reel 10 shown in FIG. 3, abuts against a projection 54 on the pivot plate 20.

A finger 56 is pivotally mounted on the pivot plate 20 adjacent the casting edge 13 of the spool 12. The finger 56 is arranged to move between a position spaced from the spool 12 and a position in which it is in engagement with the casting edge 13 of the spool 12. Movement of the finger 56 is effected by means of a rod 58 linking the finger 56 with the lever 44. Preferably, the finger 56 is covered with a resilient material such as rubber or plastic.

In use, a fishing line is wrapped around the spool 12 and extended along the fishing rod 28.

In the condition shown in FIG. 2, the retrieval guide 40 is aligned with the spool 12 and spaced from the shallow slope portion of the recess. The actuating member 42 is locked into the position shown by the abutment of the extension 52 against the projection 54 of the pivot plate 20. The finger 56 is spaced from the casting edge 13 of the spool 12. The spool 12 is pivoted through 90° to enable a cast to be made. This is achieved by applying finger pressure to the actuating member 42 to cause it to pivot away from the pivot plate 20 against the action of the spring 50. This movement pushes the extension 52 past the projection 54 and frees the mechanism. Continued application of finger pressure on the actuating member 42 causes the spool 12 to be pivoted through 90° relative to the fishing rod 28. This is achieved by pivotal movement of the pivot plate 20 on the pin 24 relative to the base plate 22. Simultaneously the pin 34 traverses the slot 30 in the base plate 22 and first moves towards the stud 38 and then back away from the stud 38. The net result of the relative movement between the pivot plate 20, the base plate 22 and the bracket 32 is that the guide 40 moves relative to the spool 12 from the position shown in FIG. 2 to that shown in FIG. 5. In the position shown in FIG. 5 the spool 12 is ready for casting. So that the mechanism is held firmly in the position shown in FIG. 5 a hook 60 on the base plate 22 is arranged to releasably engage with a projection 62 mounted on the pivot plate 20.

Whilst the actuating member 42 is being urged by finger pressure against the spring 50 it is also drawing on the rod 58 which thereby pivots the finger 56 into engagement with the casting edge 13 of the spool 12 to hold the fishing line during the initial part of the cast. Upon release of the actuating member 42 the finger 56 is pivoted away from the spool 12 by the urging of the spring 50 acting through the rod 58. The lever 44 also returns into engagement with the stop 48.

The line is cast in known manner by projecting the rod forwardly so causing the line to run off the casting edge 13 of the spool 12 which is held stationary. When the cast is complete the spool 12 is returned to the position shown in FIG. 2 whereat the extension 52 is in abutment with the projection 54.

When it is desired to retrieve the line the handle 16 is turned so causing the spool 12 to rotate and take up the line. As can be seen in FIG. 2 the guide 40 is orientated parallel to the casting edge of the spool 12 and is spaced from the shallow slope of the recess thereof. In this position the guide 40 reduces the possibility of the line running over the casting edge 13 and becoming entangled during the retrieval operation. The presence of the bracket 18 reduces the possibility of the line running over the other edge of the spool 12.

As can be seen from the above the initial part of the cast of the fishing reel illustrated in the accompanying drawings can be a one handed operation since the line is held by the finger 56. Further, the guide 40 reduces the possibility of the line running over the casting edge of the spool 12 and becoming entangled. Still further the finger 56 and guide 40 are both so arranged to not interfere with casting off the line.

Modifications and variations such as would be apparent to a skilled addressee in the fishing reel art are deemed within the scope of the present invention. For example beneficial results would still be obtained if either of the line retrieval guide means or the line holding means were omitted. Alternatively, the operation of the guide means and holding means could be made independent of one another if desired. Any form of guide means can be used providing it reduces the possibility of the line becoming entangled upon retrieval but does not interfere with casting. Similarly, any form of line holding means can be used providing the line can be held during the initial part of the cast.

We claim:

1. A fishing reel assembly of the side cast type for storing and displacing a line comprising:
    (1) a circular spool having a casting edge and pivotably mounted for movement about a diametrical axis;
    (2) a pivotably mounted line retrieval guide means positioned for reducing the possibility of a fishing line running over the casting edge of the spool whilst the line is being retrieved and for pivoting clear of the casting edge of the spool upon pivoting of the spool to the casting position;
    (3) a base plate disposed perpendicular to the pivot axis of the spool and provided with means for attachment to an external fishing rod;
    (4) a pivot plate disposed perpendicular to the pivot axis of the spool, said pivot plate being pivotably mounted about a point on the base plate for pivotal movement with the spool relative to the base plate;
    (5) mounting means comprising an L-shaped bracket provided with a longitudinal slot, said bracket having one end pivotably mounted about a mounting point eccentrically located with reference to the pivotal mounting of the pivot plate so that the mounting point of the bracket describes an arc about the mounting point of the pivot plate, and
    (6) a stud located on the base plate and disposed in the slot of the bracket to traverse at least part of the slot, and the guide means having a first end attached to the bracket laterally thereof and a second end pivotably attached to a portion of the base plate proximate the side of the spool remote from said first end of said guide means to pivot the guide means clear of the casting edge of the spool in the casting position.

2. A fishing reel assembly according to claim 1, which comprises an actuating means for rotating the spool between the casting and retrieval positions.

3. A fishing reel assembly according to claim 1 wherein the guide means comprises a substantially semicircular wire having the ends thereof diametrically opposite across the spool and having a lower end formed through a right angle.

4. A fishing reel assembly according to claim 1, which comprises means for holding the line during the initial part of the cast.

5. A fishing reel assembly according to claim 4, wherein the means for holding the line is in the form of a finger arranged to engage with the casting edge of the spool.

6. A fishing reel assembly according to claim 4, wherein the means for holding the line is connected to a mechanism for pivoting the spool and is caused to hold the line upon pivoting of the spool.

* * * * *